(12) United States Patent
Allen et al.

(10) Patent No.: US 10,803,070 B2
(45) Date of Patent: Oct. 13, 2020

(54) SELECTING A CONTENT SUMMARY BASED ON RELEVANCY

(71) Applicant: International Business Machines Corporation, Armonk, NY (US)

(72) Inventors: Corville O. Allen, Morrisville, NC (US); Andrew R. Freed, Cary, NC (US); Joseph N. Kozhaya, Morrisville, NC (US); Dwi Sianto Mansjur, North Sumatra (ID)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 15/224,371

(22) Filed: Jul. 29, 2016

(65) Prior Publication Data
US 2018/0032525 A1  Feb. 1, 2018

(51) Int. Cl.
*G06F 16/2457* (2019.01)
*G06F 16/248* (2019.01)
*G06F 16/34* (2019.01)
*G06F 16/36* (2019.01)

(52) U.S. Cl.
CPC ...... *G06F 16/24578* (2019.01); *G06F 16/248* (2019.01); *G06F 16/345* (2019.01); *G06F 16/36* (2019.01)

(58) Field of Classification Search
CPC .................................................. G06F 16/245
See application file for complete search history.

(56) References Cited

U.S. PATENT DOCUMENTS

| | | |
|---|---|---|
| 7,293,016 B1 | 11/2007 | Shakib et al. |
| 8,145,617 B1 | 3/2012 | Verstak et al. |
| 8,195,637 B1 | 6/2012 | Datar et al. |
| 8,661,029 B1 | 2/2014 | Kim et al. |
| 8,938,463 B1 | 1/2015 | Kim et al. |
| 8,959,093 B1* | 2/2015 | Nerurkar ............. G06F 16/9535 707/751 |
| 9,183,499 B1 | 11/2015 | Krivokon et al. |
| 10,585,930 B2 | 3/2020 | Allen et al. |
| 2006/0161542 A1 | 7/2006 | Cucerzan et al. |
| 2007/0208730 A1* | 9/2007 | Agichtein ............. G06F 16/337 |
| 2007/0266025 A1* | 11/2007 | Wagner ............... G06F 16/9535 |
| 2008/0189074 A1 | 8/2008 | Lin et al. |
| 2009/0198667 A1* | 8/2009 | Groeneveld .......... G06F 16/345 |
| 2009/0241018 A1 | 9/2009 | Costello et al. |
| 2011/0302162 A1* | 12/2011 | Xiao ....................... G06F 16/29 707/724 |
| 2011/0314007 A1* | 12/2011 | Dassa ............... G06F 16/24578 707/723 |

(Continued)

OTHER PUBLICATIONS

Advisory Action from U.S. Appl. No. 15/224,301, dated Aug. 28, 2018.

(Continued)

*Primary Examiner* — Dawaune A Conyers
(74) *Attorney, Agent, or Firm* — Zilka-Kotab, P.C.

(57) ABSTRACT

A computer-implemented method according to one embodiment includes identifying a plurality of different summaries for a single instance of content, calculating a relevancy score for each of the plurality of different summaries, and selecting one of the plurality of different summaries, based on the relevancy score for each of the plurality of different summaries.

7 Claims, 7 Drawing Sheets

(56) References Cited

U.S. PATENT DOCUMENTS

| | | | |
|---|---|---|---|
| 2012/0143790 | A1 | 6/2012 | Wang et al. |
| 2012/0259620 | A1 | 10/2012 | Vratskides et al. |
| 2013/0166652 | A1* | 6/2013 | Conway ............... H04L 65/403 709/204 |
| 2015/0032738 | A1* | 1/2015 | Nachnani ............. G06F 16/285 707/723 |
| 2015/0220647 | A1* | 8/2015 | Gangwani ............ G06F 16/358 707/731 |
| 2015/0227531 | A1* | 8/2015 | Kulesza ............. G06F 3/04817 715/739 |
| 2016/0105335 | A1 | 4/2016 | Choudhary et al. |
| 2016/0110433 | A1 | 4/2016 | Sawhney et al. |
| 2016/0110656 | A1 | 4/2016 | Yamada et al. |
| 2018/0032609 | A1 | 2/2018 | Allen et al. |

OTHER PUBLICATIONS

Allen et al., U.S. Appl. No. 15/224,301, filed Jul. 29, 2016.
Kohn, "Search Pogosticking and SEO," Blind Five Year Old, Nov. 14, 2008, pp. 1-5, retrieved from http://www.blindfiveyearold.com/search-pogosticking-and-seo.
List of IBM Patents or Patent Applications Treated as Related.
Bar-Llan et al., "Methods for comparing rankings of search engine results," Computer networks 50.10, 2006, pp. 1-19.
Kohn, "Is Click Through Rate a Ranking Signal," Blind Five Year Old, Jun. 24, 2015, pp. 1-26, Retreived from http://www.blindfiveyearold.com/is-click-through-rate-a-ranking-signal.
Kohn, "Queries & Clicks May Influence Google's Results More Directly Than Previously Suspected," MOZ, May 1, 2014, pp. 1-8, Retrieved From https://moz.com/rand/queries-clicks-influence-googles-results/.
Kohn, "Time to Long Click," Blind Five Year Old, Apr. 17, 2013, pp. 1-21, Retrieved From http://www.blindfiveyearold.com/time-to-long-click.
Non-Final Office Action from U.S. Appl. No. 15/224,301, dated Sep. 28, 2018.
Final Office Action from U.S. Appl. No. 15/224,301, dated May 14, 2018.
McCloskey, H., "The 1-2-3's of A/B Testing: Am Intro to Split and Multivariate Tests for Product Managers," UserVoice, Jul. 14, 2015, pp. 1-9 retrieved from https://community.uservoice.com/blog/ab-split-testing-product/.
Green, D., "A/B Split Testing: How to Use the Right Test Progression to Get Customer Discoveries and Results," Aug. 17, 2015, pp. 1-5 retrived from https://marketingexperiments.com/value-proposition/ab-split-testing-how-to-use-the-right-test-progression-to-get-customer-discoveries-and-results.
Non-Final Office Action from U.S. Appl. No. 15/224,301, dated Sep. 20, 2017.
Final Office Action from U.S. Appl. No. 15/224,301, dated Apr. 18, 2019.
Advisory Action from U.S. Appl. No. 15/224,301, dated Jul. 30, 2019.
Notice of Allowance from U.S. Appl. No. 15/224,301, dated Sep. 27, 2019.
Corrected Notice of Allowance from U.S. Appl. No. 15/224,301, dated Nov. 4, 2019.

* cited by examiner

SELECTING A CONTENT SUMMARY BASED ON RELEVANCY

BACKGROUND

The present invention relates to data summarization, and more specifically, this invention relates to analyzing a summary of content.

Content summarization is used in a variety of sectors of industry. As display screens shrink to accommodate mobile devices, the amount any type of information displayed on the screen increases in importance. Of equal importance is the ability to determine an effectiveness of summarized information presented on the screen.

SUMMARY

A computer-implemented method according to one embodiment includes identifying a plurality of different summaries for a single instance of content, calculating a relevancy score for each of the plurality of different summaries, and selecting one of the plurality of different summaries, based on the relevancy score for each of the plurality of different summaries.

According to another embodiment, a computer program product for selecting one of a plurality of different summaries for a single instance of content based on a relevancy score for each of the plurality of different summaries comprises a computer readable storage medium having program instructions embodied therewith, wherein the computer readable storage medium is not a transitory signal per se, and where the program instructions are executable by a processor to cause the processor to perform a method comprising identifying, utilizing the processor, the plurality of different summaries for a single instance of content, calculating, utilizing the processor, the relevancy score for each of the plurality of different summaries, and selecting, utilizing the processor, one of the plurality of different summaries, based on the relevancy score for each of the plurality of different summaries.

A system according to another embodiment includes a processor, and logic integrated with the processor, executable by the processor, or integrated with and executable by the processor, where the logic is configured to identify a plurality of different summaries for a single instance of content, calculate a relevancy score for each of the plurality of different summaries, and select one of the plurality of different summaries, based on the relevancy score for each of the plurality of different summaries.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for selecting a content summary based on relevancy. Various embodiments provide a method to calculate relevancy scores for a plurality of different summaries and select one of the summaries based on the relevancy scores.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for selecting a content summary based on relevancy.

In one general embodiment, a computer-implemented method includes identifying a plurality of different summaries for a single instance of content, calculating a relevancy score for each of the plurality of different summaries, and selecting one of the plurality of different summaries, based on the relevancy score for each of the plurality of different summaries.

In another general embodiment, a computer program product for selecting one of a plurality of different summaries for a single instance of content based on a relevancy score for each of the plurality of different summaries comprises a computer readable storage medium having program instructions embodied therewith, wherein the computer readable storage medium is not a transitory signal per se, and where the program instructions are executable by a processor to cause the processor to perform a method comprising identifying, utilizing the processor, the plurality of different summaries for a single instance of content, calculating, utilizing the processor, the relevancy score for each of the plurality of different summaries, and selecting, utilizing the processor, one of the plurality of different summaries, based on the relevancy score for each of the plurality of different summaries.

In another general embodiment, a system includes a processor, and logic integrated with the processor, executable by the processor, or integrated with and executable by the processor, where the logic is configured to identify a plurality of different summaries for a single instance of content, calculate a relevancy score for each of the plurality of different summaries, and select one of the plurality of different summaries, based on the relevancy score for each of the plurality of different summaries.

Figure 1:
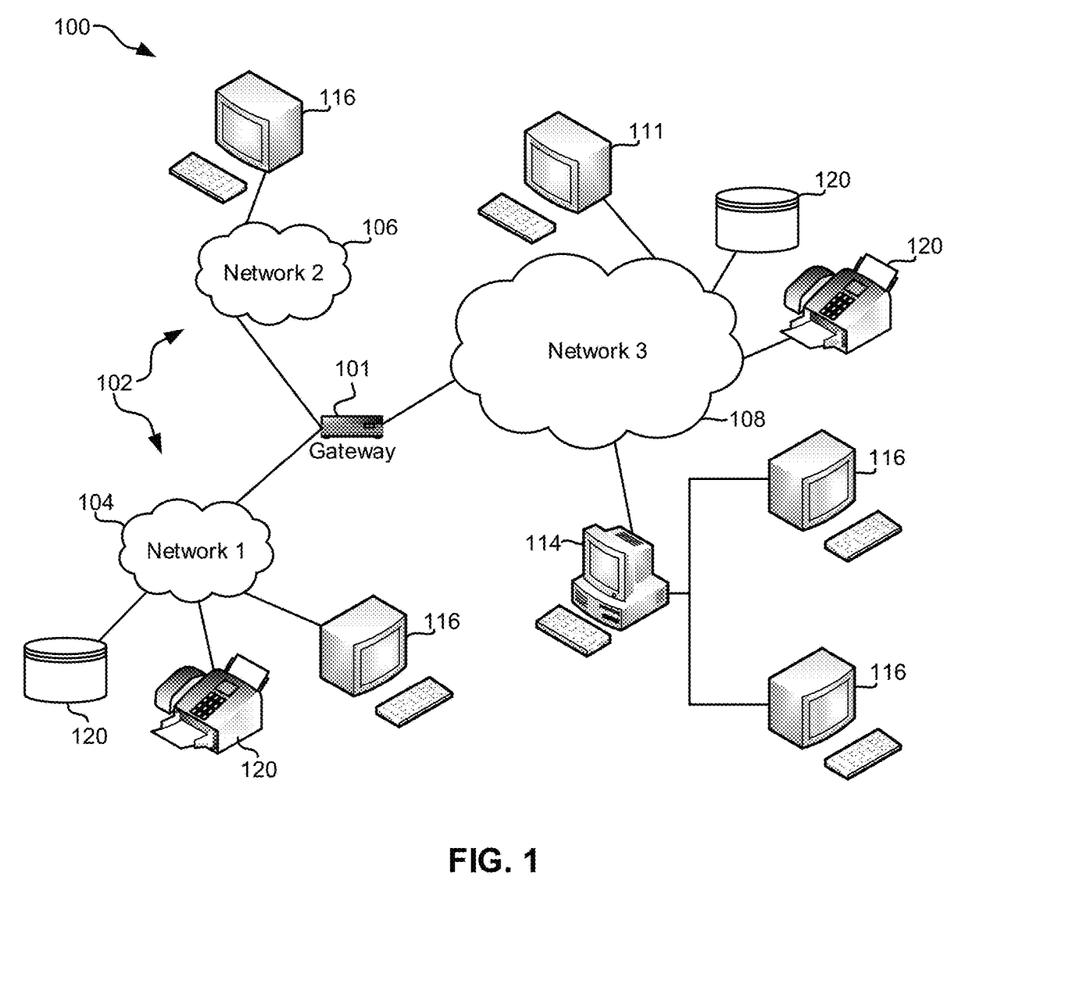
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, handheld computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
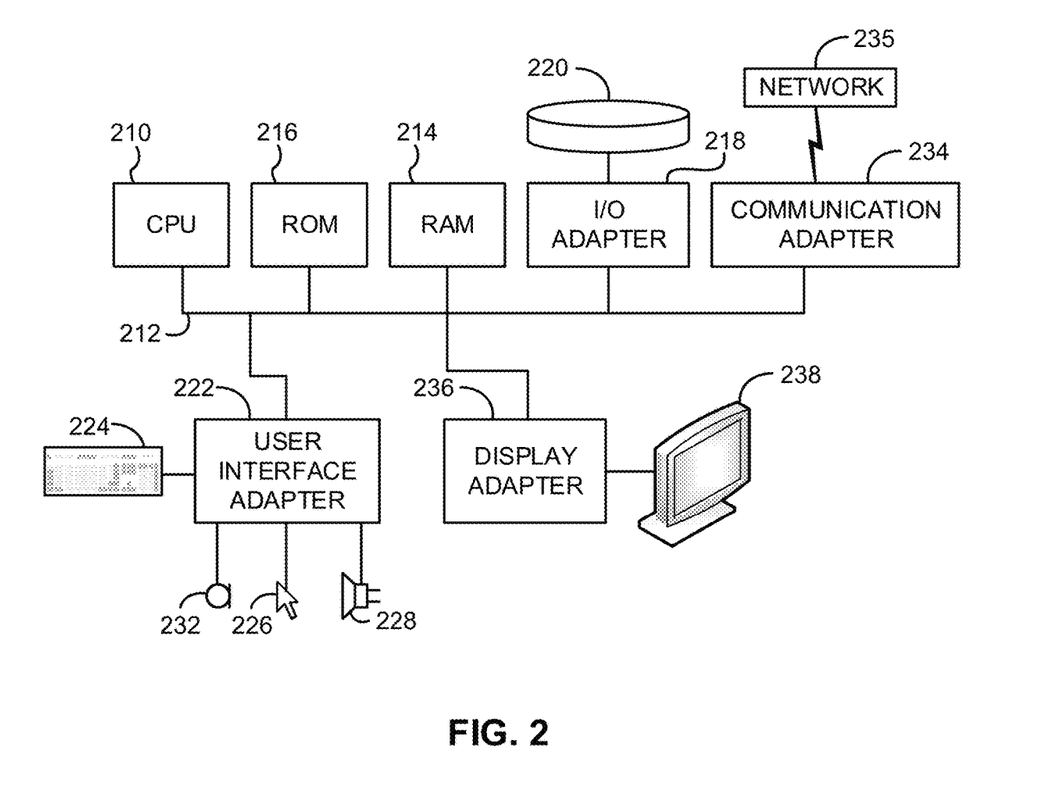
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
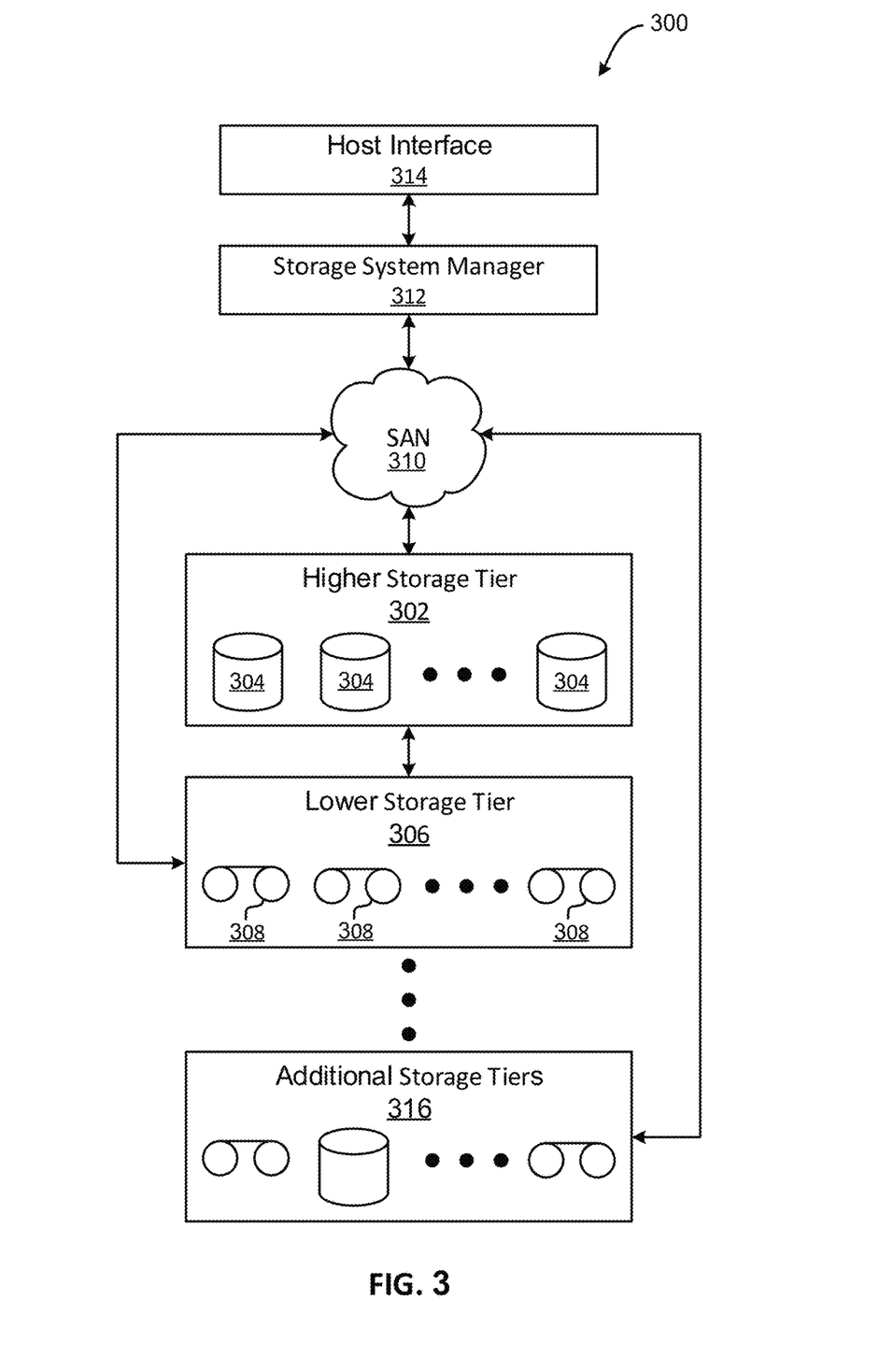
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
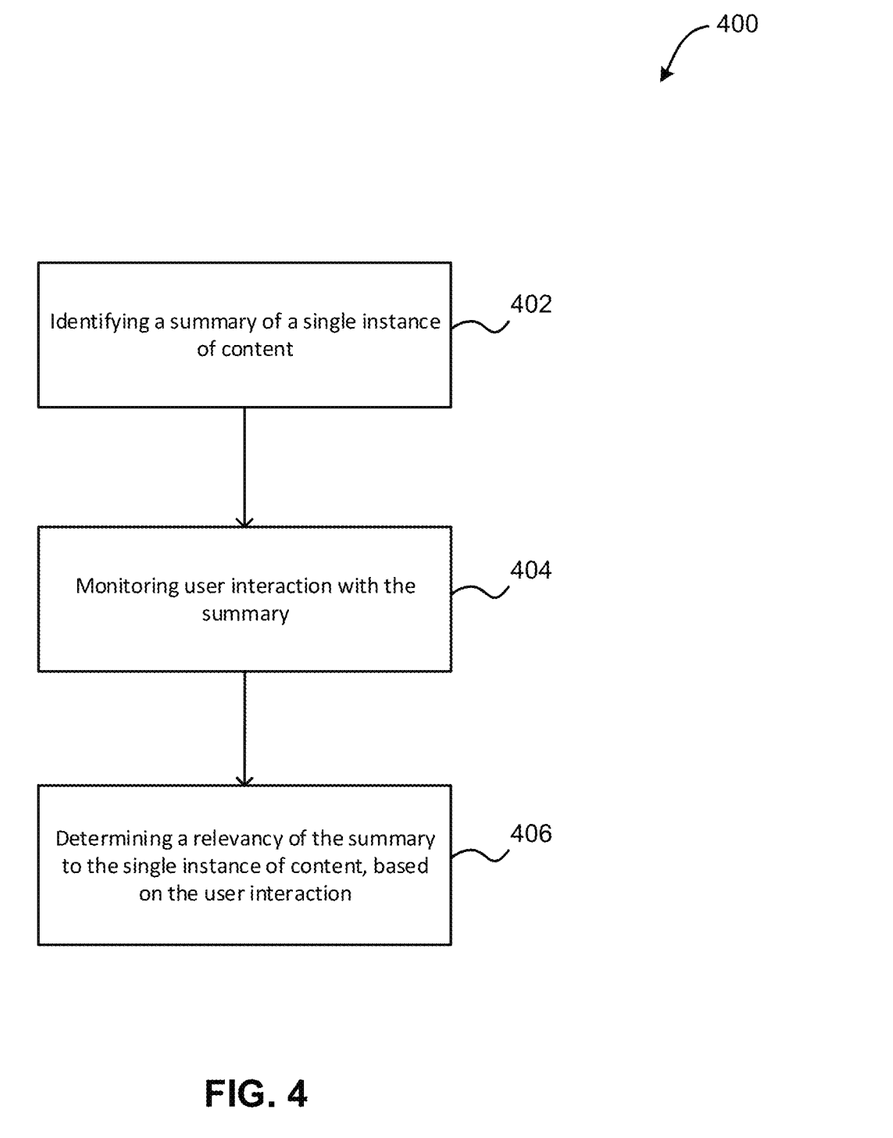
FIG. 4 illustrates a method for determining a relevancy of a content summary, in accordance with one embodiment.

Now referring to FIG. 4, a flowchart of a method 400 is shown according to one embodiment. The method 400 may be performed in accordance with the present invention in any of the environments depicted in FIGS. 1-3 and 5-7, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a summary of a single instance of content is identified. In one embodiment, the summary may be created utilizing a unique summarization method. For example, a summarization method may include a technique for summarizing the single instance of content. In another example, the summarization method may include identifying a portion of the single instance of content. For example, the summarization method may identify a portion of the single instance of content that has the highest relevance. In another example, the summarization method may abridge the content, shorten the content, reduce the content, etc.

Additionally, in one embodiment, the summarization method may be performed according to one or more criteria unique to the summarization method. For example, the summarization method may consider a type of the content, one or more terms and concepts within the content, a search query associated with the content, etc. In another embodiment, the single instance of content may include one or more of textual content and image content. For example, the single instance of content may include one or more of a web page, a document, a video, a collection of pictures, etc.

Further, in one embodiment, the summary may include a highlighted portion of the single instance of content that describes the single instance of content in an abridged fashion. For example, the summary may include a portion of the content saved during the performance of a summarization method that is returned instead of the entirety of the single instance of content when the single instance of content matches a request (e.g., matches a search query, etc.). In another embodiment, the summary may include a uniform resource locator (URL) (e.g., a URL indicating a location of the single instance of content, etc.).

Further, as shown in FIG. 4, method 400 may proceed with operation 404, where user interaction with the summary is monitored. In one embodiment, the summary may be presented to the user in response to one or more criteria being met. For example, the summary may be selected and returned to the user, where the summary includes a link to the single instance of the content, when the single instance of content is identified in response to a query submitted by the user. In another embodiment, the summary may be included within a list of a plurality of different query results, where each query result includes a summary of a unique instance of content.

Also, in one embodiment, monitoring the user interaction may include monitoring how a plurality of users interact with the summary. For example, a plurality of users may be presented with the summary when the single instance of content matched the query of each of the users.

In addition, in one embodiment, monitoring the user interaction with the summary may include identifying one or more of a plurality of aspects of the user interaction with the summary. For example, one aspect may include a user selection of the summary (e.g., a selection of a link (e.g., a URL, etc.) included with the summary to obtain the unabridged version of the single instance of content, etc.). In another example, another aspect may include an amount of time spent by the user viewing the single instance of content after selecting the summary. For instance, a time spent by the user viewing a web page, reading a document, viewing a video, etc. as a result of selecting the summary may be saved and associated with the summary.

Furthermore, in one embodiment, one aspect of the user interaction with the summary may include a selection of one or more additional links within the single instance of content. For example, if the single instance of content is a web page, the user interaction may include a selection of one or more links within the web page.

Further still, as shown in FIG. 4, method 400 may proceed with operation 406, where a relevancy of the summary to the single instance of content is determined, based on the user interaction. In one embodiment, the relevancy may indicate an effectiveness of the summary. For example, the relevancy may indicate how effective the summary is at summarizing the single instance of content. In another embodiment, the relevancy may be determined by analyzing the one or more aspects of the user interaction with the summary.

For example, the relevancy may be determined by analyzing the selection of the summary, where the summary may be determined to have a higher relevancy when the summary is selected by the user in response to a query. In another example, the relevancy may be determined by analyzing the amount of time spent viewing the single instance of content that is presented to the user in response to the user selection of the summary (e.g., the user selection of a URL pointing to the content that is included within the summary, etc.).

More specifically, in one example, a higher relevancy may be determined for the summary the longer a user spends viewing the single instance of content, as this may indicate that the user found the single instance of content useful and found the summary relevant. In another example, a period of time may be calculated between the moment the user selects the summary (e.g., a URL of the summary) to view the single instance of content and the moment the user stops viewing the single instance of content (e.g., by navigating away from the content, going back to earlier content, etc.).

Also, in one example, the relevancy may be determined by analyzing the selection of one or more links within the single instance of content. For instance, the summary may be determined to have a higher relevancy when the user selects one or more URLs within the single instance of content, as this may indicate that the user found the single instance of content useful and found the summary relevant.

Additionally, in one embodiment, the determined relevancy may be normalized with respect to the user interaction. For example, the determined relevancy may be normalized to account for different user behavior one handheld devices and desktop devices, different behavior during different times of day, average reading speed and click activity determined for a plurality of users, etc.

Further, in one embodiment, determining the relevancy of the summary to the single instance of content may include generating a score for the summary, based on the monitored user interaction. For example, each of a plurality of aspects of the user interaction may analyzed, and a score may be assigned to the summary based on the analysis. For instance, the score may reflect a time that the user viewed the single instance of content that is presented to the user in response to the user selection of the summary.

In another example, the score may reflect a number of links selected by a user within the single instance of content. In yet another example, the score be increased when one or more of the plurality of aspects exceed one or more predetermined thresholds (e.g., one or more calculated averages, etc.). In this way, the score of the summary may indicate the relevancy of the summary.

Figure 5:
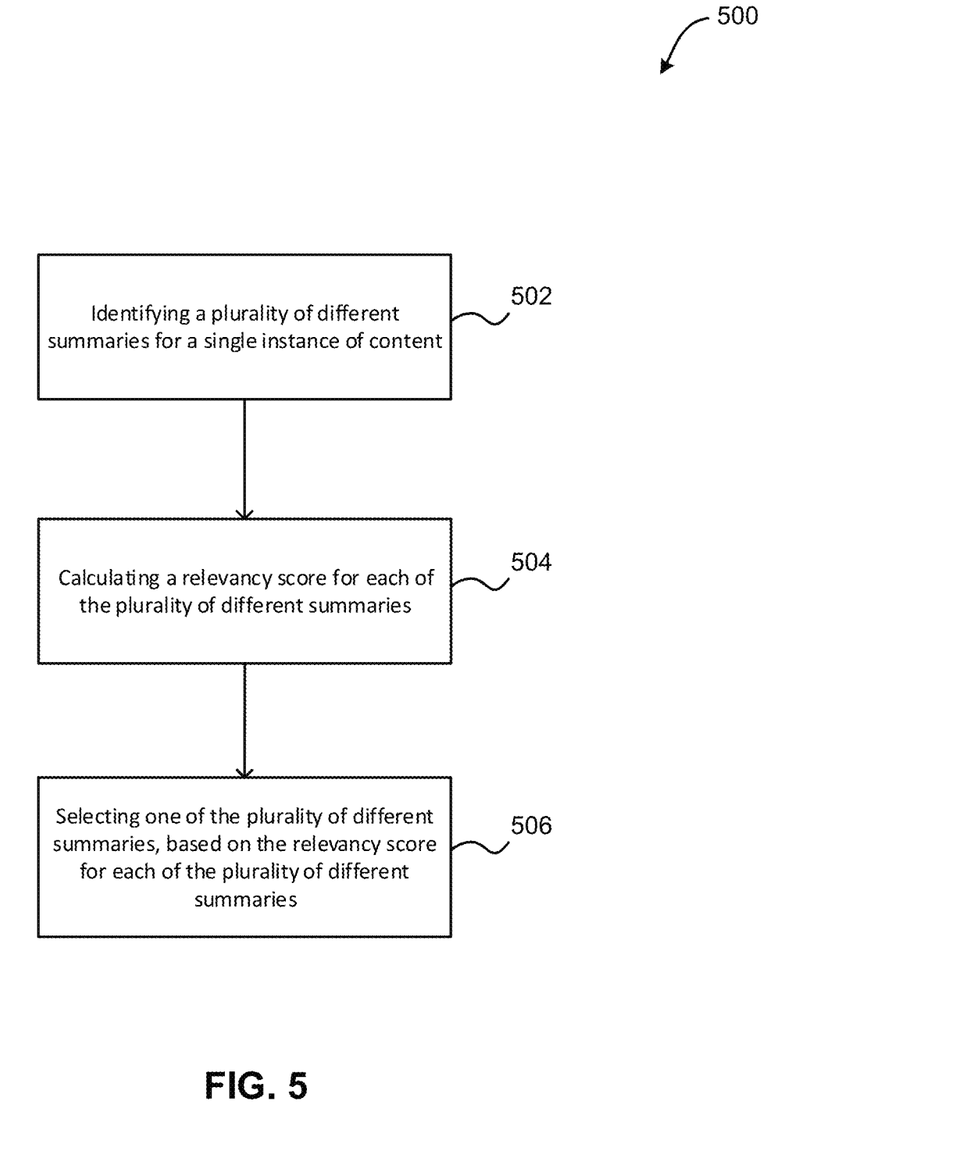
FIG. 5 illustrates a method for selecting one of a plurality of content summaries, in accordance with one embodiment.

Now referring to FIG. 5, a flowchart of a method 500 for selecting one of a plurality of content summaries is shown according to one embodiment. The method 500 may be performed in accordance with the present invention in any of the environments depicted in FIGS. 1-4 and 6-7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a plurality of different summaries are identified for a single instance of content. In one embodiment, each of the plurality of different summaries may be created utilizing a unique summarization method. In another embodiment, each summarization method may be performed according to one or more criteria unique to the summarization method.

Further, in one embodiment, each of the plurality of different summaries may include a highlighted portion of the single instance of content that describes the single instance of content in an abridged fashion. For example, each of the plurality of different summaries may include a portion of the content saved during the performance of a summarization method that is returned instead of the entirety of the single instance of content when the single instance of content matches a request (e.g., matches a search query, etc.). In another embodiment, each of the plurality of different summaries may include a uniform resource locator (URL) (e.g., a URL indicating a location of the single instance of content, etc.)

Further, method 500 may proceed with operation 504, where a relevancy score is calculated for each of the plurality of different summaries. In one embodiment, the relevancy score may be calculated by submitting each of the plurality of different summaries to a plurality of users in response to user queries. For example, one of the plurality of different summaries may be selected and returned to the user along with a URL for the single instance of the content when the single instance of content is returned in response to a query submitted by the user.

Also, in one embodiment, the summary may be selected from the plurality of different summaries according to one or more criteria. For example, the summary may be selected randomly from the plurality of different summaries each time the single instance of content is returned in response to a query of the user. In another embodiment, the summary may be selected based on a confidence associated with one or more of the plurality of different summaries. For example, the plurality of different summaries may be divided into one or more clusters based on an associated confidence, such that each cluster has an associated confidence. In another example, a summary may be randomly selected from a cluster, starting with a cluster having the highest associated confidence.

In addition, in one embodiment, the relevancy score may be calculated by monitoring each of a plurality of user interactions with each of the plurality of different summaries, in response to the submitting. For example, monitoring each user interaction may include monitoring how each of the plurality of users interacts with each of the plurality of summaries. In another example, monitoring each user interaction may include identifying one or more of a plurality of aspects of the user interaction with each summary.

Further, in one embodiment, calculating the relevancy score may include determining a relevancy of each of the plurality of different summaries to the single instance of content, based on the plurality of user interactions. For example, the relevancy of each of the plurality of different summaries may be determined by analyzing the one or more aspects of the user interactions with each of the plurality of summaries.

Further still, in one embodiment, calculating the relevancy score may include normalizing the determined relevancy for each of the plurality of different summaries with respect to the plurality of user interactions. In another embodiment, calculating the relevancy score may include generating a score for the each of the plurality of summaries, based on the normalized determined relevancy for each of the plurality of summaries Also, method 500 may proceed with operation 506, where one of the plurality of different summaries is selected, based on the relevancy score calculated for each of the plurality of different summaries. In one embodiment, selecting the one of the plurality of different summaries may include ranking each of the plurality of different summaries, based on the calculated relevancy score for each of the plurality of different summaries. In another embodiment, a list of the plurality of different summaries may be created, where summaries having a higher score are ranked higher than summaries having a lower score.

Additionally, in one embodiment, the selected summary may include the summary with the highest ranking, the summary highest in the list, the summary with the highest relevancy score, etc. In another embodiment, the summarization technique utilized to create the highest ranked summary (e.g., the summary highest on the list, etc.) may be identified and may be selected to be used to summarize the single instance of content. In this way, the most effective summary and summarization technique (e.g., the summarization technique that results in the most relevant summary, etc.) may be identified.

Figure 6:
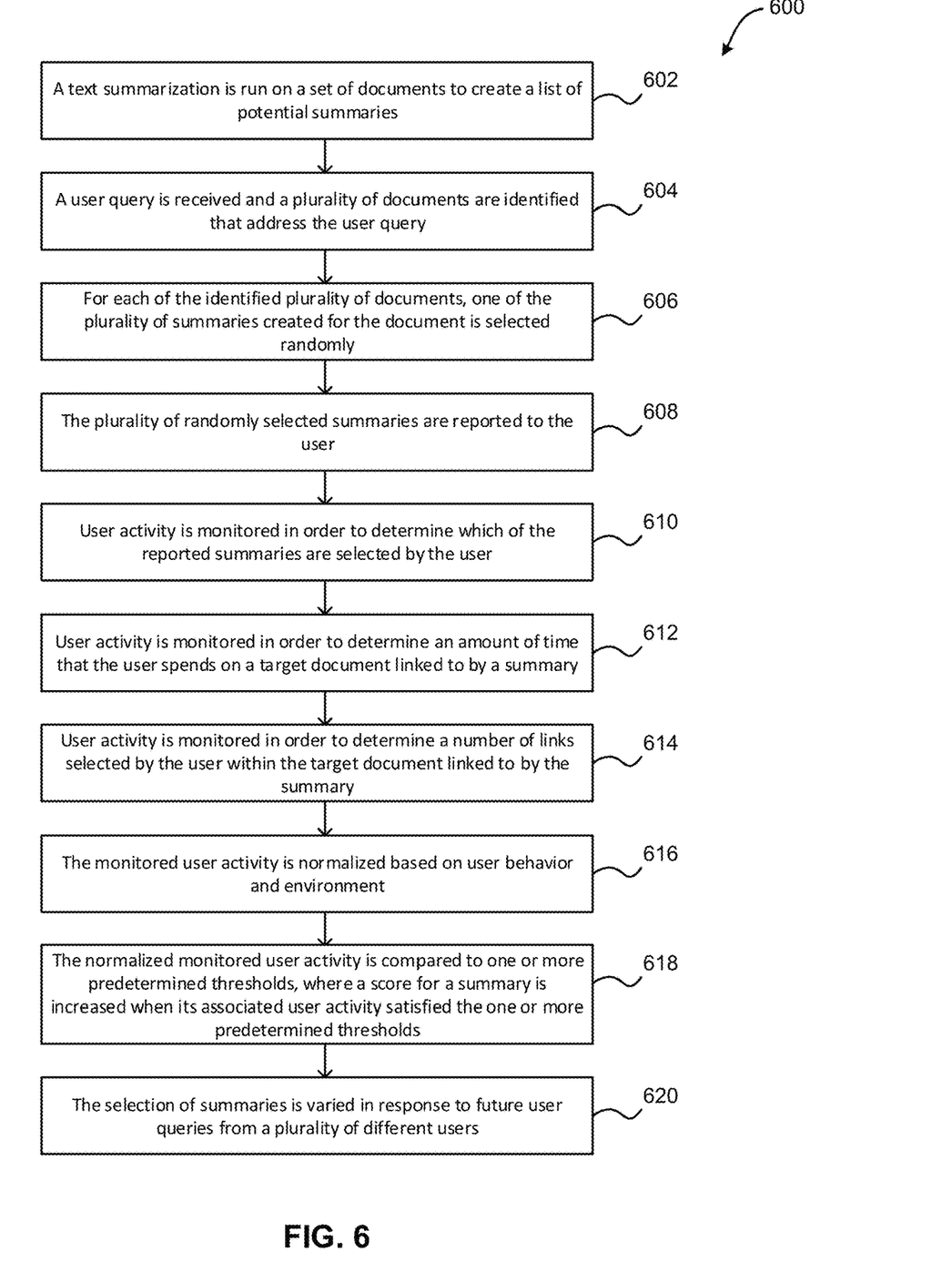
FIG. 6 illustrates a method for monitoring and ranking summaries, in accordance with one embodiment.

Now referring to FIG. 6, a flowchart of a method 600 for monitoring and ranking summaries is shown according to one embodiment. The method 600 may be performed in accordance with the present invention in any of the environments depicted in FIGS. 1-5 and 7, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a text summarization is run on a set of documents to create a list of potential summaries. In one embodiment, a plurality of text summarizations may be run on each document within the set of documents to create a plurality of summaries for each document. For example, for a document d, a list of potential summaries for the document d may be $S_d$. In another embodiment, the list of potential summaries may be broken up into clusters based on confidence. For example, a granularity of the clusters of summaries may be configurable (e.g., based on a confidence range, etc.), and may be as small as one summary per cluster or as large as all summaries per cluster, or somewhere in between. In yet another embodiment, each summarization may include a process of reducing a document to capture only the most important points highlighted within the document.

Additionally, method 600 may proceed with operation 604, where a user query is received and a plurality of documents are identified that address the user query. Further, method 600 may proceed with operation 606, where for each of the identified plurality of documents, one of the plurality of summaries created for the document is selected randomly. In one embodiment, for each identified document, one of the summaries may be randomly selected from one of a plurality of clusters associated with the document, starting with a cluster having the highest confidence and progressing toward a cluster having the lowest confidence.

Further still, method 600 may proceed with operation 608, where the plurality of randomly selected summaries are reported to the user. In one embodiment, each of the randomly selected summaries may include a link to the associated document (e.g., the document summarized by the summary). Also, method 600 may proceed with operation 610, where user activity is monitored in order to determine which of the reported summaries are selected by the user. In one embodiment, the user may be monitored in order to determine which links included within the summaries are clicked on by the user, in order to gauge how relevant the user thinks the summary is to their query.

In addition, method 600 may proceed with operation 612, where user activity is monitored in order to determine an amount of time that the user spends on a target document linked to by a summary. In one embodiment, the user may be monitored to determine how much time the user spends on a document (e.g., web page, etc.) after clicking a link in a summary of the document to arrive at the document. Furthermore, method 600 may proceed with operation 614, where user activity is monitored in order to determine a number of links selected by the user within the target document linked to by the summary. In one embodiment, the user may be monitored to determine a number of times the user clicks deeper into more pages linked from the summary page.

Further still, method 600 may proceed with operation 616, where the monitored user activity is normalized based on user behavior and environment. For example, users on handheld devices may spend more time viewing a document than users on a desktop or larger screen devices. In another example, users may have different behaviors (e.g., being a slow or fast reader, etc.). For instance, if user A spends 3-5 minutes reading a page while user B spends 1-2 minutes reading a page, then deciding how quickly a user navigates away from the page may be normalized by a typical range for the specific user. Similarly, if user A clicks 4 levels deep within the document before retracting to an original landing page, and user B clicks only 2 levels deep, then monitored user activity may be based on a normalized range of depth of clicks.

Also, method 600 may proceed with operation 618, where the normalized monitored user activity is compared to one or more predetermined thresholds, where a score for a summary is increased when its associated user activity satisfied the one or more predetermined thresholds. Additionally, method 600 may proceed with operation 620, where the selection of summaries is varied in response to future user queries from a plurality of different users. In this way, by tracking user interactions with documents such as a web page, and normalizing the results to account for different user behavior patterns and environment patterns, a rank/score may be determined for a summary that identifies how well the summary reflects the content it is summarizing.

Figure 7:
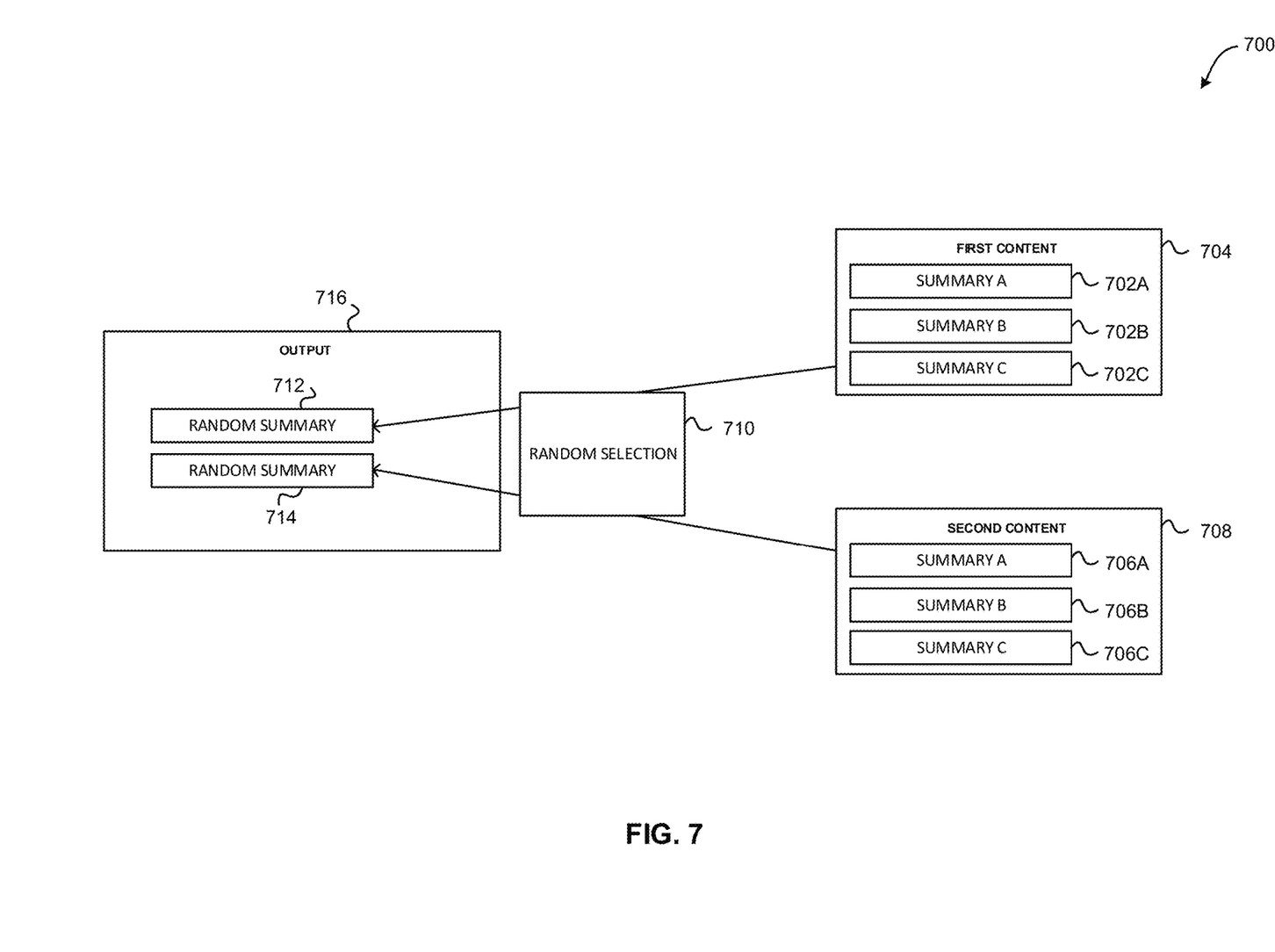
FIG. 7 illustrates an exemplary summary selection, in accordance with one embodiment.

Now referring to FIG. 7, an exemplary summary selection 700 is shown according to one embodiment. The exemplary summary selection 700 may be implemented in accordance with the present invention in any of the environments depicted in FIGS. 1-6, among others, in various embodiments.

One or more components of the exemplary summary selection 700 may be performed by any suitable component of the operating environment. For example, in various embodiments, the exemplary summary selection 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to implement the exemplary summary selection 700. Illustrative processors include, but are not limited to, a central processing unit (CPU), an application specific integrated circuit (ASIC), a field programmable gate array (FPGA), etc., combinations thereof, or any other suitable computing device known in the art.

As shown, three separate summaries 702A-C are created for first content 704. In one embodiment, each of the three separate summaries 702A-C may be distinct and may be created for the first content 704 utilizing a unique summarization technique. Also, three separate summaries 706A-C are created for second content 708. In one embodiment, each of the three separate summaries 706A-C may be distinct and may be created for the second content 708 utilizing a unique summarization technique.

Additionally, a random selection 710 is made of one of the three separate summaries 702A-C, resulting in randomly selected summary 712, and one of the three separate summaries 706A-C, resulting in randomly selected summary 714. Further, the randomly selected summaries 712 and 714 are presented as output 716 to the user. In one embodiment, the randomly selected summaries 712 and 714 may be selected and presented in response to a user query.

For example, the user may submit a query, where both the first content 704 and the second content 708 are returned in response to the query. In response, the randomly selected summaries 712 and 714 may then be determined and output to the user as a response to the query. In another embodiment, the randomly selected summary 712 may include a link (e.g., a URL) to the first content 704, and the randomly selected summary 714 may include a link (e.g., a URL) to the second content 708.

Further, in one embodiment, the summary selection may be performed for each of a plurality of users (e.g., during a training period). For example, each of the plurality of users may submit a query that returns both the first content 704 and the second content 708, and may receive randomly selected summaries 712 and 714 as a result. In another embodiment, a user may select a URL included with a summary when they feel the summary is relevant to their query. If after clicking on the URL, the user finds the actual content not relevant, they may click back to a previous page (e.g., a landing page, etc.). However, if the user finds the content relevant, they may spend a longer time viewing the content, interacting with the content, etc.

Table 1 illustrates an exemplary summarization training with three instance of content, in accordance with one embodiment. Of course, it should be noted that the exemplary summarization training shown in Table 1 is set forth for illustrative purposes only, and thus should not be construed as limiting in any manner.

TABLE 1

| User 1 gets: | User 2 gets: | User 3 gets: |
|---|---|---|
| Content 1, Summary 1A | Content 1, Summary 1B | Content 1, Summary 1C |
| Content 2, Summary 2A | Content 2, Summary 2A | Content 2, Summary 2B |
| Content 3, Summary 3A | Content 3, Summary 3C | Content 3, Summary 3B |

| User 4 gets: | User 5 gets: | User 6 gets: |
|---|---|---|
| Content 1, Summary 1C | Content 1, Summary 1B | Content 1, Summary 1A |
| Content 2, Summary 2B | Content 2, Summary 2C | Content 2, Summary 2C |
| Content 3, Summary 3B | Content 3, Summary 3C | Content 3, Summary 3A |

Further still, in one example, three instances of content (Content 1, Content 2, and Content 3) may be provided, where each instance of content has three possible summaries (1A, 1B, 1C, 2A, 2B, 2C, 3A, 3B, 3C). In another embodiment, an expected score for each instance of content may include $EXP\_SCORE_i$, and actual click throughs for each summary determined by monitoring user activity during training may include $ACTUAL\_SCORE_{ij}$. In yet another embodiment, the average of $ACTUAL\_SCORE_{ij}$ over all summaries for an instance of content i may equal $EXP\_SCORE_i$. In still another embodiment, the most effective summary j of content i may be found by ranking $ACTUAL\_SCORE_{ij}$ from high to low, and selecting the summary with the highest score. In another embodiment, the average of $ACTUAL\_SCORE_{ij}$ may also be used to re-rank each instance of content.

Table 2 illustrates an exemplary training implementation and ordering with three instance of content, in accordance with one embodiment. Of course, it should be noted that the exemplary training implementation and ordering shown in Table 2 is set forth for illustrative purposes only, and thus should not be construed as limiting in any manner.

TABLE 2

| Content (score) | Summaries for each instance of content | Summarization score from monitoring/click-through analysis | Conclusion |
|---|---|---|---|
| Content 1 (0.9) | 1A | 1A: 0.87 | 1B is most effective summary of Content 1 |
|  | 1B | 1B: 0.93 |  |
|  | 1C | 1C: 0.87 |  |
| Content 2 (0.7) | 2A | 2A: 0.63 | 2C is most effective summary of Content 2 |
|  | 2B | 2B: 0.66 |  |
|  | 2C | 2C: 0.73 |  |
| Content 3 (0.4) | 3A | 3A: 0.04 | 3C is most effective summary of Content 3 |
|  | 3B | 3B: 0.30 | Content 3 may be more relevant than Content 2, based on summarization scores (3C > 2C) |
|  | 3C | 3C: 0.86 |  |

Also, in one embodiment, after training is performed, the most effective summary for each instance of content may be determined, based on the summarization score for each summary that is obtained by monitoring user activity during summarization training. Table 3 illustrates an exemplary result of the summarization training shown in Tables 1 and 2, in accordance with one embodiment. Of course, it should be noted that the exemplary result shown in Table 3 is set forth for illustrative purposes only, and thus should not be construed as limiting in any manner.

TABLE 3

Most effective summaries:

Content 1 - Summary 1B
Content 2 - Summary 2C
Content 3 - Summary 3C

In this way, monitored user interaction with summaries may be used to determine how well the summaries represent the actual content being summarized, and may be leveraged to select a most effective summary (and summarization method) from a group of summaries created using a variety of different summarization methods. Also, a number of summaries presented to the user may be optimized, and ad revenue resulting from the summaries may be maximized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying a plurality of different summaries of a single instance of content, where each of the plurality of different summaries are created utilizing a summarization technique different from other summarization techniques used to create other summaries in the plurality of different summaries, and each of the plurality of different summaries includes a portion of the single instance of content saved during a performance of the summarization technique that is returned instead of an entirety of the single instance of content when the single instance of content matches a request;
returning each of the plurality of different summaries to a plurality of users in response to an identification of the single instance of content matching search queries submitted by the plurality of users, where:
each of the plurality of different summaries are divided into a plurality of clusters, based on a confidence value associated with each of the plurality of different summaries, such that each of the plurality of clusters has an associated confidence value,
a granularity of the plurality of clusters is configured, utilizing a confidence value range, and
each of the plurality of different summaries are randomly selected from the plurality of clusters to be returned to one of the plurality of users in response to the identification of the single instance of content matching one of the search queries submitted by the one of the plurality of users, starting with a cluster having a highest associated confidence value;
monitoring interactions between the plurality of users and the plurality of different summaries, including for each of the interactions, identifying a plurality of aspects for the interactions, the aspects including:
a selection of a uniform resource locator (URL) included within one of the plurality of different summaries by the one of the plurality of users,
an amount of time spent by the one of the plurality of users viewing the single instance of content after selecting the URL, and
a number of additional links selected by the one of the plurality of users within the single instance of content;
normalizing the interactions for each of the plurality of users to create normalized interactions, including, for each of the plurality of users:
determining a typical reading speed of the one of the plurality of users,
determining an amount of time spent by the one of the plurality of users viewing the single instance of content after selecting the URL,
adjusting the determined amount of time according to the typical reading speed of the one of the plurality of users,
determining a typical range of depth of clicks of the one of the plurality of users, including a typical number of levels selected within a document by the one of the plurality of users before retracting to an original landing page,
determining a depth of clicks performed by the one of the plurality of users viewing the single instance of content after selecting the URL, and
adjusting the depth of clicks performed by the one of the plurality of users according to the typical range of depth of clicks of the one of the plurality of users,
wherein the normalizing also accounts for an environment including a size of a screen used by the one of the plurality of users to view the single instance of content;
calculating a relevancy score for each of the plurality of different summaries, based on the normalized interactions for each of the plurality of users;
for each of the plurality of different summaries:
comparing the normalized interactions for the different summaries to one or more predetermined thresholds, and
increasing the relevancy score for the different summaries in response to determining that the normalized interactions for the different summaries satisfy the one or more predetermined thresholds;
ranking the plurality of different summaries, based on the relevancy score for each of the plurality of different summaries; and selecting one of the plurality of different summaries having a highest ranking of the plurality of different summaries, based on the relevancy score for each of the plurality of different summaries.

2. The computer-implemented method of claim 1, wherein the single instance of content is selected from a group consisting of textual content and image content.

3. The computer-implemented method of claim 1, wherein each of the plurality of different summaries includes a uniform resource locator (URL).

4. A computer program product for selecting one of a plurality of different summaries for a single instance of content based on a relevancy score for each of the plurality of different summaries, the computer program product comprising a computer readable storage medium having program instructions embodied therewith, wherein the computer readable storage medium is not a transitory signal per se, the program instructions executable by a processor to cause the processor to perform a method comprising:

identifying, utilizing the processor, the plurality of different summaries of the single instance of content, where each of the plurality of different summaries are created utilizing a summarization technique different from other summarization techniques used to create other summaries in the plurality of different summaries, and each of the plurality of different summaries includes a portion of the single instance of content saved during a performance of the summarization technique that is returned instead of an entirety of the single instance of content when the single instance of content matches a request;

returning, utilizing the processor, each of the plurality of different summaries to a plurality of users in response to an identification of the single instance of content matching search queries submitted by the plurality of users, where:

each of the plurality of different summaries are divided into a plurality of clusters, based on a confidence value associated with each of the plurality of different summaries, such that each of the plurality of clusters has an associated confidence value, a granularity of the plurality of clusters is configured, utilizing a confidence value range, and each of the plurality of different summaries are randomly selected from the plurality of clusters to be returned to one of the plurality of users in response to the identification of the single instance of content matching the one of the search queries submitted by the one of the plurality of users, starting with a cluster having a highest associated confidence value;

monitoring, utilizing the processor, interactions between the plurality of users and the plurality of different summaries, including for each of the interactions, identifying a plurality of aspects for the interactions, the aspects including:

a selection of a uniform resource locator (URL) included within the one of the plurality of different summaries by the one of the plurality of users, an amount of time spent by the one of the plurality of users viewing the single instance of content after selecting the URL, and a number of additional links selected by the one of the plurality of users within the single instance of content;

normalizing, utilizing the processor, the interactions for each of the plurality of users to create normalized interactions, including, for each of the plurality of users:

determining a typical reading speed of the one of the plurality of users, determining an amount of time spent by the one of the plurality of users viewing the single instance of content after selecting the URL, adjusting the determined amount of time according to the typical reading speed of the one of the plurality of users, determining a typical range of depth of clicks of the one of the plurality of users, including a typical number of levels selected within a document by the one of the plurality of users before retracting to an original landing page, determining a depth of clicks performed by the one of the plurality of users viewing the single instance of content after selecting the URL, and adjusting the depth of clicks performed by the one of the plurality of users according to the typical range of depth of clicks of the one of the plurality of users, wherein the normalizing also accounts for an environment including a size of a screen used by the one of the plurality of users to view the single instance of content;

calculating, utilizing the processor, the relevancy score for each of the plurality of different summaries, based on the normalized interactions for each of the plurality of users;

for each of the plurality of different summaries:

comparing, utilizing the processor, the normalized interactions for the different summaries to one or more predetermined thresholds, and increasing, utilizing the processor, the relevancy score for the different summaries in response to determining that the normalized interactions for the different summaries satisfy the one or more predetermined thresholds;

ranking, utilizing the processor, the plurality of different summaries, based on the relevancy score for each of the plurality of different summaries; and selecting, utilizing the processor, one of the plurality of different summaries having a highest ranking of the plurality of different summaries, based on the relevancy score for each of the plurality of different summaries.

5. The computer program product of claim 4, wherein the single instance of content is selected from a group consisting of textual content and image content.

6. The computer program product of claim 4, wherein each of the plurality of different summaries includes a uniform resource locator (URL).

7. A system, comprising:

a processor; and logic integrated with the processor, executable by the processor, or integrated with and executable by the processor, the logic being configured to:

identify a plurality of different summaries of a single instance of content, where each of the plurality of different summaries are created utilizing a summarization technique different from other summarization techniques used to create other summaries in the plurality of different summaries, and each of the plurality of different summaries includes a portion of the single instance of content saved during a performance of the summarization technique that is returned instead of an entirety of the single instance of content when the single instance of content matches a request;

return each of the plurality of different summaries to a plurality of users in response to an identification of the single instance of content matching search queries submitted by the plurality of users, where:
- each of the plurality of different summaries are divided into a plurality of clusters, based on a confidence value associated with each of the plurality of different summaries, such that each of the plurality of clusters has an associated confidence value,
- a granularity of the plurality of clusters is configured, utilizing a confidence value range, and
- each of the plurality of different summaries are randomly selected from the plurality of clusters to be returned to one of the plurality of users in response to the identification of the single instance of content matching one of the search queries submitted by the one of the plurality of users, starting with a cluster having a highest associated confidence value;

monitor interactions between the plurality of users and the plurality of different summaries, including for each of the interactions, identifying a plurality of aspects for the interactions, the aspects including:
- a selection of a uniform resource locator (URL) included within one of the plurality of different summaries by the one of the plurality of users,
- an amount of time spent by the one of the plurality of users viewing the single instance of content after selecting the URL, and
- a number of additional links selected by the one of the plurality of users within the single instance of content;

normalize the interactions for each of the plurality of users to create normalized interactions, including, for each of the plurality of users:
- determining a typical reading speed of the one of the plurality of users,
- determining an amount of time spent by the one of the plurality of users viewing the single instance of content after selecting the URL,
- adjusting the determined amount of time according to the typical reading speed of the one of the plurality of users,
- determining a typical range of depth of clicks of the one of the plurality of users, including a typical number of levels selected within a document by the one of the plurality of users before retracting to an original landing page,
- determining a depth of clicks performed by the one of the plurality of users viewing the single instance of content after selecting the URL, and
- adjusting the depth of clicks performed by the one of the plurality of users according to the typical range of depth of clicks of the one of the plurality of users,
- wherein the normalizing also accounts for an environment including a size of a screen used by the one of the plurality of users to view the single instance of content;

calculate a relevancy score for each of the plurality of different summaries, based on the normalized interactions for each of the plurality of users;

for each of the plurality of different summaries:
- compare the normalized interactions for the different summaries to one or more predetermined thresholds, and
- increase the relevancy score for the different summaries in response to determining that the normalized interactions for the different summaries satisfy the one or more predetermined thresholds;

rank the plurality of different summaries, based on the relevancy score for each of the plurality of different summaries; and select one of the plurality of different summaries having a highest ranking of the plurality of different summaries, based on the relevancy score for each of the plurality of different summaries.

\* \* \* \* \*